United States Patent
Wang et al.

(10) Patent No.: US 10,126,490 B2
(45) Date of Patent: Nov. 13, 2018

(54) DISPLAY DEVICE AND BACKLIGHT MODULE USED THEREIN

(71) Applicant: AU Optronics Corporation, Hsin-Chu (TW)

(72) Inventors: Wei-Shyang Wang, Hsin-Chu (TW);
Shin-Wei Huang, Hsin-Chu (TW);
Chih-Liang Hsieh, Hsin-Chu (TW);
Ching-Kun Lai, Hsin-Chu (TW);
Meng-Chia Liu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 53 days.

(21) Appl. No.: 15/438,921

(22) Filed: Feb. 22, 2017

(65) Prior Publication Data
US 2017/0276866 A1 Sep. 28, 2017

(30) Foreign Application Priority Data
Mar. 28, 2016 (TW) .............................. 105109692 A

(51) Int. Cl.
*G02B 6/00* (2006.01)
*G02F 1/1333* (2006.01)
(Continued)

(52) U.S. Cl.
CPC ......... *G02B 6/0088* (2013.01); *G02B 6/0086* (2013.01); *G02F 1/133608* (2013.01)

(58) Field of Classification Search
CPC .. G02B 6/0088; G02B 6/0086; G02B 6/0051; G02B 6/0053; G02F 1/133608; G02F 1/133606
See application file for complete search history.

(56) References Cited

U.S. PATENT DOCUMENTS 7,197,227 B2 * 3/2007 Fan .................. G03B 21/64
349/58
7,864,261 B2 * 1/2011 Chen .................. G02B 6/0088
349/58
(Continued)

FOREIGN PATENT DOCUMENTS

CN 103386838 A 10/2013
CN 103632614 A 3/2014
(Continued)

OTHER PUBLICATIONS

Taiwan Patent Office, "Office Action" dated Dec. 21, 2016, Taiwan.
(Continued)

*Primary Examiner* — Peggy Neils
(74) *Attorney, Agent, or Firm* — WPAT, PC

(57) ABSTRACT

The present invention provides a display device and a backlight module used therein. The backlight module includes a support frame, an optical plate, a load-bearing pin, and an optical film. The support frame encloses an accommodating space. The optical plate is disposed in the accommodating space and has a light-emitting surface and a first end. The load-bearing pin is connected to the support frame and disposed across the light-emitting surface in a position close to the first end. The optical film is disposed corresponding to the light-emitting surface and has a support end and a load-bearing end opposite to each other. The support end is supported by the support frame and the load-bearing end is connected to the first end. The load-bearing pin is located between the optical film and the optical plate and the optical film is held up by the load-bearing pin so that the direction of extension of the optical film is changed.

10 Claims, 10 Drawing Sheets

(51) Int. Cl.
*F21V 8/00* (2006.01)
*G02F 1/1335* (2006.01)

(56) References Cited

U.S. PATENT DOCUMENTS

| | | | | |
|---|---|---|---|---|
| 9,004,738 | B2 * | 4/2015 | Lv | G02B 6/0088 |
| | | | | 362/615 |
| 9,250,379 | B2 * | 2/2016 | Lan | G02B 6/0088 |
| 2008/0057434 | A1 | 3/2008 | Itoh | |
| 2009/0201441 | A1 * | 8/2009 | Laney | G02F 1/133308 |
| | | | | 349/64 |
| 2013/0272022 | A1 | 10/2013 | Choi et al. | |
| 2014/0056031 | A1 | 2/2014 | Lee et al. | |

FOREIGN PATENT DOCUMENTS

| | | |
|---|---|---|
| TW | I323377 | 12/2007 |
| TW | 201100927 | 1/2011 |

OTHER PUBLICATIONS

State Intellectual Property Office of the People's Republic of China, "Office Action", dated Jan. 29, 2018.

\* cited by examiner

DISPLAY DEVICE AND BACKLIGHT MODULE USED THEREIN

BACKGROUND

Technical Field

The present invention relates to a backlight module and a display device in which the backlight module is used, and particularly, the present invention relates to a backlight module having a leveled optical film and a display device in which the backlight module is used.

Related Art

To achieve different optical effects, generally various optical films such as a diffusion film, a brightness enhancement film, and a polarizing film are disposed in a backlight module. Conventionally, the optical films are all disposed in the backlight module in a natural hanging manner. That is, like a curtain, the optical films hang from a frame edge with one ends connected thereto. In this configuration mode, abnormal film waving may occur in the optical films of the backlight module when the backlight module is heated or wetted and further detectable, undesired phenomena such as P Mura and Egg Mura may appear, causing a sharp reduction in the display quality.

Generally, the factors that may cause abnormal film waving in an optical film include: being unevenly heated and expanding at different degrees, interference that is caused during heating if a gap between the optical film and a mechanism is excessively small, residual stress after the optical film is manufactured or cut, or the like. Therefore, there is an urgent need to provide a method for resolving the abnormal film waving in an optical film caused by heating or wetting.

SUMMARY

One objective of the present invention is to provide a backlight module capable of alleviating abnormal film waving of an optical film caused by heating or wetting.

The other objective of the present invention is to provide a backlight module in which the tension of an optical film is produced by utilizing weight of an optical plate and using a load-bearing pin so as to enable the optical film to maintain a flat surface.

The present invention provides a display device and a backlight module thereof. The backlight module includes a support frame, an optical plate, a load-bearing pin, and an optical film. The support frame encloses an accommodating space. The optical plate is disposed in the accommodating space and has a light-emitting surface and a first end. The load-bearing pin is connected to the support frame and disposed across the light-emitting surface in a position close to the first end. The optical film is disposed corresponding to the light-emitting surface and has a support end and a load-bearing end opposite to each other. The support end is supported by the support frame and the load-bearing end is connected to the first end. The load-bearing pin is located between the optical film and the optical plate and the optical film is held up by the load-bearing pin so that the direction of extension of the optical film is changed.

The present invention provides a display device and a backlight module thereof. The backlight module includes a support frame, an optical plate, a support end pin, and an optical film. The support frame encloses an accommodating space. The optical plate is disposed in the accommodating space and has a light-emitting surface, a first end, and a second end opposite to the first end. The support end pin is connected to the support frame and disposed across the light-emitting surface in a position close to the second end. The optical film is disposed corresponding to the light-emitting surface and has a support end and a load-bearing end opposite to each other. The support end is connected to the second end and the load-bearing end is connected to the first end. The support end pin is located between the optical film and the optical plate and the optical film is held up by the support end pin so that the direction of extension of the optical film is changed.

DETAILED DESCRIPTION

Figure 1:
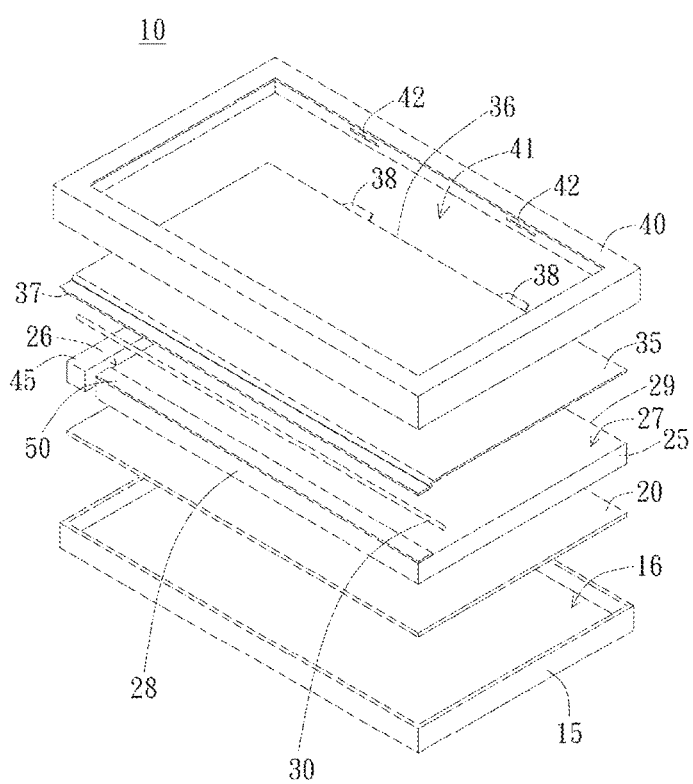
FIG. 1 is a schematic exploded view illustrative of a backlight module according to a first preferred embodiment of the present invention.
Figure 2A:
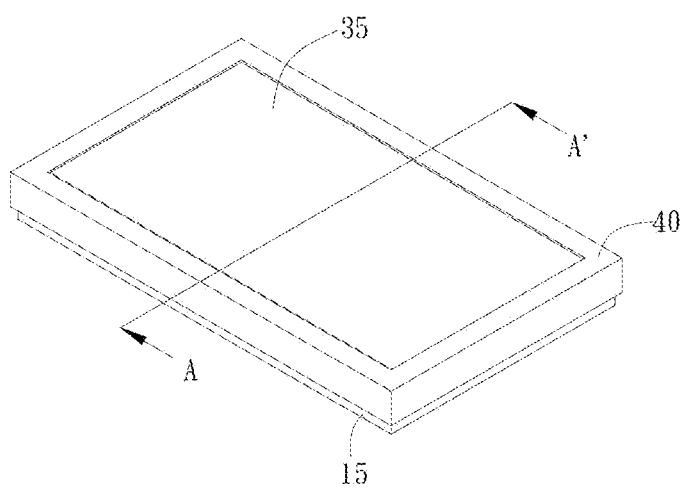
FIG. 2A is a constitutional diagram illustrative of FIG. 1.
Figure 2B:
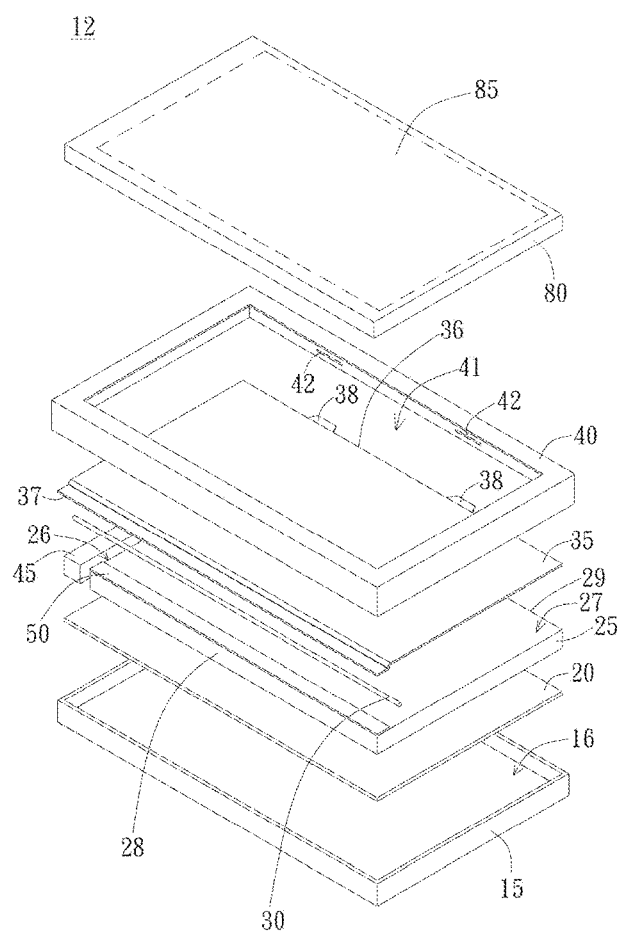
FIG. 2B is a schematic exploded view illustrative of a display device integrated with the backlight module in FIG. 1 and a display module.
Figure 3:
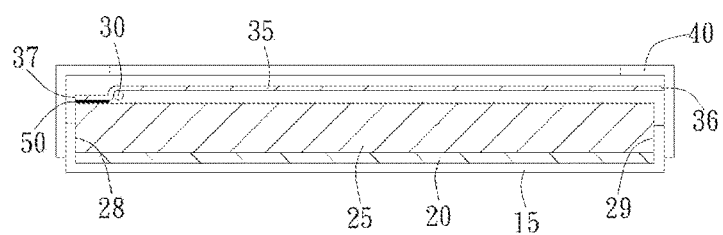
FIG. 3 is a section diagram illustrative of FIG. 2A in the A-A' direction.

Simultaneously referring to FIG. 1, FIG. 2A, FIG. 2B, and FIG. 3, FIG. 1 is a schematic exploded view illustrative of a backlight module according to a first preferred embodiment of the present invention, FIG. 2A is a constitutional diagram illustrative of FIG. 1, FIG. 2B is a schematic exploded view illustrative of a display device integrated with the backlight module in FIG. 1 and a display module, and FIG. 3 is a section diagram illustrative of FIG. 2A in the A-A' direction.

A backlight module 10 is used in a display device 12 and includes a bezel 15, an optical plate 25, a load-bearing pin 30, an optical film 35, and a support frame 40. The bezel 15 encloses a first accommodating space 16, and the optical plate 25 is disposed in the first accommodating space 16, where the optical plate 25 preferably includes a light guide plate or a diffusion plate.

In this preferred embodiment, optionally, a reflective sheet 20 is additionally disposed in the first accommodating space 16, and the optical plate 25 is disposed above the reflective sheet 20. The optical plate 25 has a light-incident surface 26 and a light-emitting surface 27. In this preferred embodiment in which a side-incident light source is provided, the backlight module 10 further includes a light-source module 45. The light-source module 45 is preferably prevented from being located at the same side of the optical plate 25 with the load-bearing pin 30.

For example, light-source modules 45 are preferably distributed along the light-incident surface 26 and disposed by the side of the light-incident surface 26 of the optical plate 25, but are kept away from the position in which the load-bearing pin 30 extends to run through the light-incident surface 26, that is, in a direction intersecting with the direction of extension of the light-incident surface 26 (substantially perpendicular to each other, for example) and the direction of extension of the vertical projection of the load-bearing pin 30 on the bezel 15, where the direction of extension of the light-incident surface 26 is not the direction of thickness of the optical plate 25.

However, in another embodiment, the direct-lit design of a light source may also be adopted. In this case, the optical plate 25 preferably is a diffusion plate above the light-source module 45, and the direction of extension of the vertical projection of the load-bearing pin 30 on the bezel 15 may be actually parallel to the long axis (long side) of the optical plate 25.

The support frame 40 preferably encloses a second accommodating space 41, for example, an up-and-down through opening. In an embodiment, if the size of the second accommodating space 41 corresponds to that of the bezel 15, it can be regarded that the second accommodating space 41 is not shielded by the bezel 51, or the second accommodating space 41 exposes (or reveals) the bezel, that is, the vertical projection of the second accommodating space 41 on the bezel 15 is overlapped with the bezel 51, and at least a part of the support frame 40 may enclose the circumference of the bezel 15, so that the bezel 15 is positioned in the second accommodating space 41 of the support frame 40. However, in another embodiment, the size of the first accommodating space 16 of the bezel 15 corresponds to that of the support frame 40, and at least a part of the bezel 15 may enclose the circumference of the support frame 40, so that the support frame 40 is positioned in the first accommodating space 16 of the bezel 15.

The optical plate 25 is provided with a first end 28 and a second end 29 opposite to the first end 28. By using a light-emitting surface on two long axes (long sides) of the optical plate 25 as an example, for a side-incident light source, the first end (that is, the first end located on the light-emitting surface) 28 is substantially perpendicular to the light-incident surface 26. In another embodiment, for a direct-lit light source, the first end (that is, the first end located on the light-emitting surface) 28 is substantially parallel to the light-incident surface 26. Regardless of a side-incident or a direct-lit light source, the load-bearing pin 30 is disposed on the optical plate 25 and across the light-emitting surface 27 in a position close to the first end 28. In a preferred embodiment, as shown in FIG. 2B, the vertical projection of the load-bearing pin 30 on a display module 80 or a display panel may exceed a display region 85. Two ends of the load-bearing pin 30 are separately connected to the support frame 40 and supported by the support frame 40. In an embodiment, the mode of the connection between the load-bearing pin 30 and the support frame 40 includes, but is not limited to, providing a hole on the support frame 40 in a position corresponding to each end of the load-bearing pin 30 and inserting the two ends of the load-bearing pin 30 into the holes so that the load-bearing pin 30 is supported by the support frame 40. In another embodiment, the mode of the connection between the load-bearing pin 30 and the support frame 40 includes providing an adhesive tape on the support frame 40 in a position corresponding to each end of the load-bearing pin 30 and pasting the two ends of the load-bearing pin 30 to the adhesive tape. In still another embodiment, the mode of the connection between the load-bearing pin 30 and the support frame 40 includes that: a screw hole may be formed on each end of the load-bearing pin 30 and then each end of the load-bearing pin 30 is further locked to the support frame 40 by using a screw.

In another embodiment, the load-bearing pin 30 may be in a disconnected state in which the mid portion of the load-bearing pin 30 is not connected. Specifically, the load-bearing pin 30 may be divided into two load-bearing pins on the left and right. One ends of the two load-bearing pins are separately connected to the support frame 40 and supported by the support frame 40. In addition, the mode of the connection between the two load-bearing pins and the support frame 40 includes, but is not limited to, the aforementioned methods, which are not described again herein. In another substitute embodiment, the load-bearing pin 30 and the may also be formed in an integral manner. In other words, a support frame 40 having a load-bearing pin 30 may be formed in an integral manner.

The optical film 35 is disposed on a light-emitting surface 27 corresponding to an optical plate 25 and has a support end 36 and a load-bearing end 37 opposite to each other. It should be noted that for the two opposite ends of the optical film 35, the two ends on the two long axes (long sides) of the optical film 35, the two opposite ends of the optical film 35 being respectively opposite to the two ends on the two long axes (long sides) of the optical film 35, are used as an example. That is, the support end 36 of the optical film 35 is corresponding to the second end 29 of the optical plate 25, and the load-bearing end 37 of the optical film 35 is corresponding to the first end 28 of the optical plate 25. The support end 36 is supported by the support frame 40. In an embodiment, the present invention further includes, but is not limited to, forming at least one ear 38 on the support end 36 of the optical film 35, and forming a hole 42 on the support frame 40 in a position opposite to the ear 38, and enabling the ear 38 to run through the hole 42, so that the optical film 35 is directly suspended on the support frame 40. An example in which the ear 38 protrudes from the support end 36 of the optical film 35 is used, that is, the ear 38 is vertically projected on the support frame 40 and the ear 38 is overlapped and fixed with the support frame 40. In another embodiment, the ear 38 does not protrude from the support end 36 of the optical film 35 and be vertically projected on the support frame 40, and the ear 38 is overlapped and fixed with the support frame 40. In another embodiment, an adhesive tape (not shown) may be disposed on the support frame 40 in a position opposite to the support end 36, so that the optical film 35 is pasted to the support frame 40 via the support end 36.

As shown in FIG. 3, preferably, an adhesive tape 50, for example, a two-sided adhesive tape, is disposed on the first end 28 of the optical plate 25, the optical film 35 is held up by the load-bearing pin 30 to bend so that the direction of extension of the optical film 35 is changed, and the load-bearing end 37 of the optical film 35 is pasted to the adhesive tape 50. Therefore, as shown in FIG. 3, a bottom surface of the load-bearing end 37 of the optical film 35 is pasted, via the adhesive tape 50, to the light-emitting surface 27 located on the first end of the optical plate 25, and the load-bearing pin 30 is located between the load-bearing end 37 of the optical film 35 and the light-emitting surface 27 located on the first end of the optical plate 25.

Figure 4:
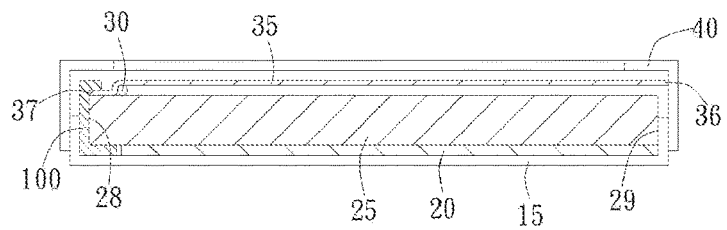
FIG. 4 is illustrative of another embodiment of FIG. 3.

It can be known that the optical film 35 may bend along with a part of the outline of the load-bearing pin 30. In another embodiment, as shown in FIG. 4, at least one jig 100 may be used to replace the adhesive tape 50. That is, the load-bearing end 37 of the optical film 35 may be clipped to the first end 28 of the optical plate 25 by using the jig 100. Therefore, as shown in FIG. 4, the jig 100 clips an upper surface of the optical film 35 and a bottom surface of the optical plate 25, so that a bottom surface of the load-bearing end 37 of the optical film 35 contacts the light-emitting surface 27 located on the first end of the optical plate 25, and that the load-bearing pin 30 is located between the bottom surface of the load-bearing end 37 of the optical film 35 and the light-emitting surface 27 located on the first end of the optical plate 25.

It can be known that the optical film 35 may bend along with a part of the outline of the load-bearing pin 30. In the aforementioned embodiments, the adhesive tape 50 is relatively light and thin and thus the number of components can be reduced, and the force that can be borne by the jig 100 is greater than that of the adhesive tape 50; therefore, the adhesive tape 50 or the jig 100 can be adopted according to actual needs. In addition, the width of the adhesive tape 50 is preferably in a range of about 3 to 10 mm, and the thickness of the adhesive tape 50 is preferable in a range of about 0.1 to 2 mm, but the present invention is not limited thereto.

Figure 5A:
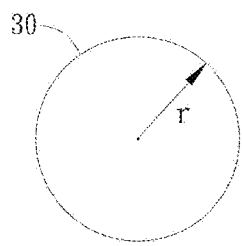
FIG. 5A to FIG. 5D are schematic cross-section diagrams illustrative of load-bearing pins according to different embodiments.
Figure 5B:
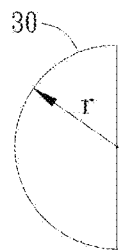
Figure 5C:
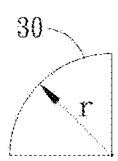
Figure 5D:
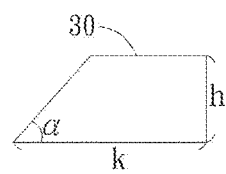

Referring to FIG. 5A to FIG. 5D, FIG. 5A to FIG. 5D are schematic cross-section diagrams illustrative of load-bearing pins according to different embodiments. The load-bearing pin 30 preferably is a cylinder, but is not limited to this shape. For example, the cross section of the load-bearing pin 30 may be in a shape of a circle (as shown in FIG. 5A), a semicircle (as shown in FIG. 5B), a quarter circle (as shown in FIG. 5C), a trapezoid (as shown in FIG. 5D), or other suitable shape of cross section. As shown in FIG. 5A to FIG. 5C, preferably, the radius r of circle of the cross section of the load-bearing pin 30 is approximately in a range of about 0.25 to 2.5 mm. In other words, preferably, the thickness of the load-bearing pin 30 is approximately in a range of about 0.5 to 5 mm. However, the present invention is not limited herein. As shown in FIG. 5D, preferably, the included angle α of the trapezoid of the cross section of the load-bearing pin 30 is approximately in a range between about 5° to 90°, the height h of the trapezoid is approximately in a range of about 0.5 to 5 mm, the bottom side k of the trapezoid is approximately less than or equal to about 6 mm. However, the present invention is not limited herein.

Figure 6A:
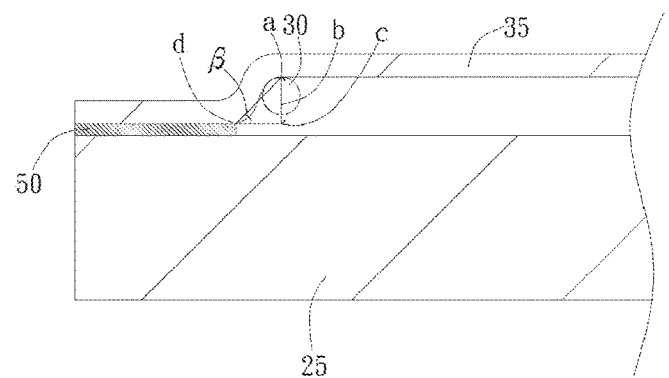
FIG. 6A is a partial section diagram illustrative of application of the backlight module in FIG. 5A.
Figure 6B:
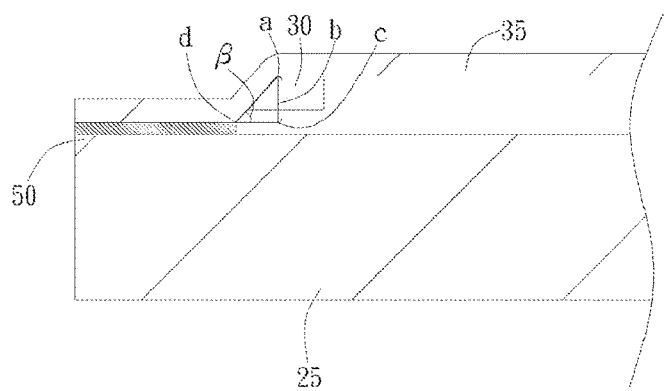
FIG. 6B is a partial section diagram illustrative of application of the backlight module in FIG. 5D.

Referring to FIG. 6A and FIG. 6B, FIG. 6A is a partial section diagram illustrative of application of the backlight module in FIG. 5A, and FIG. 6B is a partial section diagram illustrative of application of the backlight module in FIG. 5D. As shown in FIG. 6A, for the disposing position of the load-bearing pin 30, preferably, the vertical distance b between the vertex a of the circular profile thereof and the horizontal extension of the upper surface of the adhesive tape 50 (that is, the distance between the point a and the point c) is approximately in a range of about 1 to 6 mm, and the included angle β between the one end of the adhesive tape 50 close to the load-bearing pin 30 (the upper surface, that is, the horizontally extended point c of the point d) and the vertex a of the circular profile of the load-bearing pin 30 (that is, the included angle between the side ad and the horizontal extended side cd of the upper surface of the adhesive tape 50) is approximately in a range between about 5° to 90°. As shown in FIG. 6B, for the disposing position of the load-bearing pin 30, preferably, the vertical distance b between the vertex a of the trapezoid thereof and the horizontal extension of the surface of the adhesive tape 50 (that is, the distance between the point a and the point c) is approximately in a range of about 1 to 6 mm, and the included angle β between the one end of the adhesive tape 50 close to the load-bearing pin 30 (the upper surface, that is, the horizontally extended point c of the point d) and the vertex a of the trapezoid of the load-bearing pin 30 (that is, the included angle between the side ad and the horizontal extended side cd of the upper surface of the adhesive tape 50) is approximately in a range between about 5° to 90°.

Figure 7A:
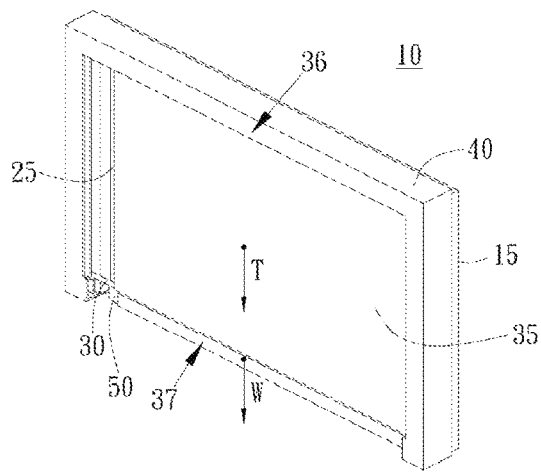
FIG. 7A is a schematic diagram illustrative of mechanical effects of a backlight module of the present invention in an upright state.
Figure 7B:
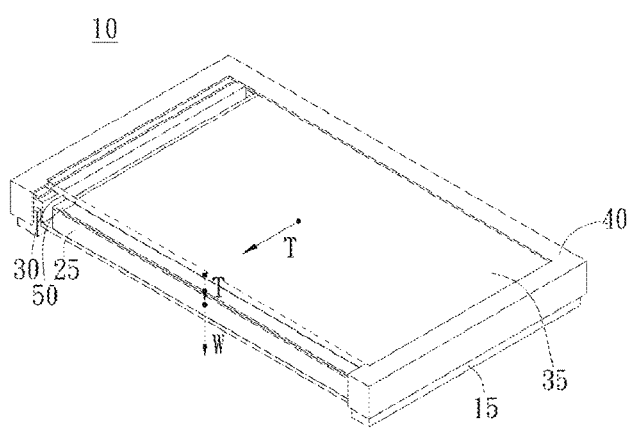
FIG. 7B is a schematic diagram illustrative of mechanical effects of a backlight module of the present invention in a flat state.

Referring to FIG. 7A and FIG. 7B, FIG. 7A is a schematic diagram illustrative of mechanical effects of a backlight module of the present invention in an upright state, and FIG. 7B is a schematic diagram illustrative of mechanical effects of a backlight module of the present invention in a flat state. As shown in FIG. 7A, when the backlight module 10 is in an upright state, two ends of the load-bearing pin 30 are separately connected to the support frame 40 and supported by the support frame 40, the support end 36 of the optical film 35 is supported by the support frame 40, and the load-bearing end 37 thereof is pasted to the first end 28 of the optical plate 25 by means of the adhesive tape 50; therefore, the short sides of the optical film 35 may be enabled to generate a tension T substantially parallel to the direction of gravity W by means of the gravity W of the optical plate 25 and the load-bearing pin 30 supported by the support frame 40.

As shown in FIG. 7B, when the backlight module 10 is in a flat state (or namely lying on a surface state), the load-bearing pin 30 supported by the support frame 40 may change the direction of the tension T of the short sides of the optical film 35. The tension T of the short axes (sides) of the optical film 35 is changed to the tension T substantially perpendicular to the direction of the gravity W from the direction parallel to the direction of the gravity W. Therefore, the tension T of the optical film 35 (the short axes (sides) or the width direction) may be maintained by means of the gravity W of the optical plate 25 and the load-bearing pin 30 supported by the support frame 40.

It should be noted that, when the backlight module of the present invention is integrated in a display device, as shown in FIG. 2B, the display device 12 further includes a display module 80 disposed on a side of the optical film 35 back to the optical plate 25 (that is the light-emitting surface), that is, a lower surface (the light-incident surface) of the optical film 35 is opposite to the light-emitting surface (the upper surface) of the optical plate 25, and the display module 80 is located on the upper surface (the light-emitting surface) the optical film 35. The display module 80 further includes a visible region, for example, a display region 85. The vertical projection of the load-bearing pin 30 on the display module 80 preferably falls outside the visible region 85, so as to prevent the load-bearing pin 30 from being observed which causes reduction in the display quality of the display module 80.

Therefore, the backlight module of the present invention generates the tension of the optical film using the weight of the optical plate and the load-bearing pin so as to enable the optical film to maintain a flat surface, and the tension of the optical film may not reduce along with the temperature or time, thereby capable of solving the problem of abnormal film waving of the optical film caused by heating or wetting. Besides, when the backlight module of the present invention is integrated in a display device, the weight, width, and thickness of the display device may not increase because it is not designed in a manner of additionally adding an object, which also satisfies the need of narrow-side display devices.

Figure 8:
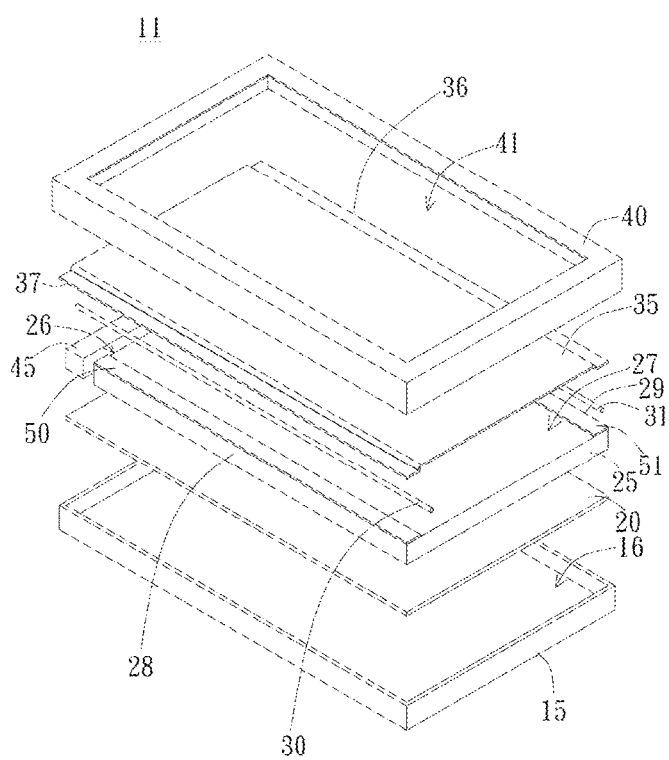
FIG. 8 is a schematic exploded view illustrative of a backlight module according to a second preferred embodiment of the present invention.
Figure 9:
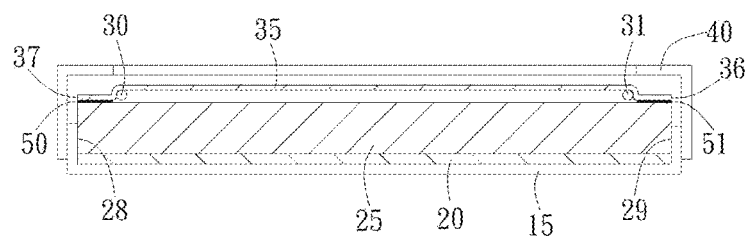
FIG. 9 is a constitutional diagram illustrative of FIG. 8.

Simultaneously referring to FIG. 8, FIG. 9, FIG. 8 is a schematic exploded view illustrative of a backlight module according to a second preferred embodiment of the present invention, and FIG. 9 is a constitutional diagram illustrative of FIG. 8. As compared with the first preferred embodiment in FIG. 1, the backlight module 11 of this embodiment further comprises a support end pin 31 connected to a support frame 40, and the support end pin 31 is disposed across the light-emitting surface 27 in a position close to the second end 29 of the optical plate 25. The mode of the connection between the support end pin 31 and the support frame 40 includes the mode of the connection between the load-bearing pin 30 and the support frame 40 in the first preferred embodiment, which is not described herein.

Figure 10:
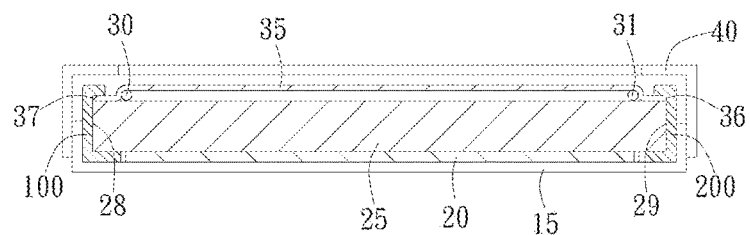
FIG. 10 is illustrative of another embodiment of FIG. 9.

The support end pin 31 is located between the optical film 35 and the optical plate 25. Two ends of the support end pin 31 are separately connected to the support frame 40 and supported by the support frame 40. In addition, preferably, an adhesive tape 51, for example, a two-sided adhesive tape, is disposed on the second end 29 of the optical plate 25, the optical film 35 is held up by the support end pin 31, so that the optical film 35 is indirectly connected to the support frame 40 and the support end 36 of the optical film 35 is pasted to the adhesive tape 51. In another embodiment, as shown in FIG. 10, at least one jig 200 may be used to replace the adhesive tape 51. That is, the support end 36 of the optical film 35 may be clipped to the second end 29 of the optical plate 25 by using the jig 200.

Figure 11A:
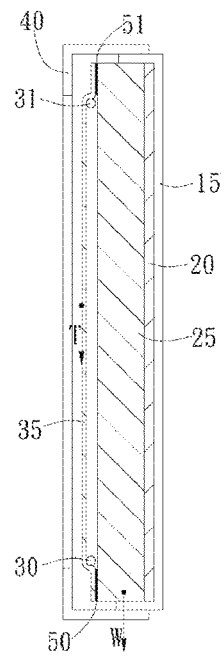
FIG. 11A is a schematic diagram illustrative of mechanical effects of the backlight module in FIG. 9 in an upright state.
Figure 11B:
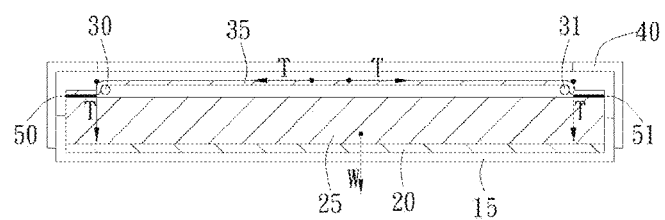
FIG. 11B is a schematic diagram illustrative of mechanical effects of the backlight module in FIG. 9 in a flat state.

The backlight module 11 according to the second preferred embodiment of the present invention, referring to the aforementioned first preferred embodiment, no matter the backlight module 11 is in an upright state (as shown in FIG. 11A) or a flat state (or namely lying on a surface state as shown in FIG. 11B), the tension T of the optical film 35 can be effectively maintained and the optical film may be enabled to maintain a flat surface by means of the weight W of the optical plate 25, and the load-bearing pin 30 and the support end pin 31 that are supported by the support frame 40, and further the abnormal film waving caused by uneven stressing of the optical film 35 can be avoided.

In view of the above, the backlight module of the present invention generates the tension of the optical film using the weight of the optical plate and the pin so as to enable the optical film to maintain a flat surface, and the tension of the optical film may not reduce along with the temperature or time, thereby capable of solving the problem of abnormal film waving of the optical film caused by heating or wetting.

The present invention is described in the foregoing relevant embodiments; however, the foregoing embodiments are only examples for implementing the present invention. It should be noted that the disclosed embodiments are not intended to limit the scope of the present invention. On the contrary, modifications and equivalent arrangements within the spirit and scope of the application patent all fall into the scope of the present invention.

What is claimed is:

1. A backlight module, comprising:
   an optical plate with a light-emitting surface and a first end;
   a load-bearing pin, disposed on the light-emitting surface near the first end;
   an optical film, disposed on the light-emitting surface, with a support end and a load-bearing end, wherein the support end is opposite to the load-bearing end, the load-bearing end is connected to the first end; and
   a support frame with an accommodating space for accommodating the optical plate, the load-bearing pin, and the optical film, wherein the load-bearing pin is connected to the support frame;
   wherein the support end is supported by the support frame, and
   wherein the load-bearing pin is located between the optical film and the optical plate, and the optical film is held up by the load-bearing pin so that a direction of extension of the optical film is changed.

2. The backlight module according to claim 1, wherein the support end is directly suspended on the support frame.

3. The backlight module according to claim 1, further comprising a support end pin connecting to the support frame, wherein the optical plate has a second end opposite to the first end, the support end pin is disposed on the light-emitting surface near the second end, the support end pin is located between the optical film and the optical plate, and the optical film is held up by the support end pin so that the direction of extension of the optical film is changed.

4. The backlight module according to claim 3, wherein the support end is connected to the second end and is held up by the support end pin, which the support end is indirectly connected to the support frame.

5. The backlight module according to claim 3, further comprising a jig for clipping the support end onto the second end.

6. The backlight module according to claim 3, wherein thickness of the load-bearing pin or the support end pin is between 0.5 and 5 mm.

7. The backlight module according to claim 1, further comprising a jig for clipping the load-bearing end onto the first end.

8. A backlight module, comprising:
   a support frame with an accommodating space;
   an optical plate, disposed in the accommodating space, with a light-emitting surface, a first end, and a second end, wherein the second end is opposite to the first end;
   a support end pin connected to the support frame and disposed on the light-emitting surface near the second end; and
   an optical film, disposed on the light-emitting surface, with a support end and a load-bearing end, wherein the load-bearing end is opposite to the support end, the support end is connected to the second end, and the load-bearing end is connected to the first end;
   wherein the support end pin is located between the optical film and the optical plate, and the optical film is held up by the support end pin so that the direction of extension of the optical film is changed.

9. The backlight module according to claim 8, further comprising a jig for clipping the support end onto the second end.

10. The backlight module according to claim 8, wherein thickness of the support end pin is between 0.5 and 5 mm.

* * * * *